United States Patent
De Waal

(10) Patent No.: US 6,846,040 B2
(45) Date of Patent: Jan. 25, 2005

(54) ROOF FRAME OF AN OPENABLE MOTOR VEHICLE ROOF

(75) Inventor: Martin Frank De Waal, Assendelft (NL)

(73) Assignee: Webasto Product International NL, AA Kampen (NL)

( * ) Notice: Subject to any disclaimer, the term of this patent is extended or adjusted under 35 U.S.C. 154(b) by 0 days.

(21) Appl. No.: 10/393,357

(22) Filed: Mar. 21, 2003

(65) Prior Publication Data

US 2004/0094995 A2 May 20, 2004

(30) Foreign Application Priority Data

Mar. 24, 2002 (DE) .......................................... 102 12 990

(51) Int. Cl.[7] .................................................. B60J 7/00
(52) U.S. Cl. .............................. 296/216.07; 296/187.12
(58) Field of Search ........................ 296/187.12, 203.03, 296/193.04, 216.06, 216.07, 216.08

(56) References Cited

U.S. PATENT DOCUMENTS

| | | |
|---|---|---|
| 3,964,784 A | 6/1976 | Prechter et al. |
| 4,601,511 A | 7/1986 | Nakamura et al. |
| 4,968,090 A | 11/1990 | Schleicher et al. |
| 5,154,482 A | 10/1992 | Hayashi et al. |
| 5,435,618 A | 7/1995 | Sacco et al. |
| 5,599,059 A | 2/1997 | Shann |
| 5,671,968 A | 9/1997 | Masuda et al. |
| 5,954,390 A | 9/1999 | Kleinhoffer et al. |
| 6,073,992 A | 6/2000 | Yamauchi et al. |
| 6,102,472 A | 8/2000 | Wallström |
| 6,209,949 B1 | 4/2001 | Sakyo et al. |
| 6,343,831 B1 | 2/2002 | Nabert et al. |
| 6,481,788 B1 | 11/2002 | Moriyama et al. |
| 2002/0153749 A1 | 10/2002 | Lee |
| 2003/0090129 A1 | 5/2003 | Riley et al. |

FOREIGN PATENT DOCUMENTS

| | | | | |
|---|---|---|---|---|
| DE | 2543734 | * | 4/1977 | |
| DE | 35 32 103 A1 | | 3/1987 | |
| DE | 40 12 635 A1 | | 10/1991 | |
| DE | 44 28 913 A1 | | 2/1996 | |
| DE | 100 34 522 A1 | | 1/2002 | |
| EP | 188837 | * | 7/1986 | ............ 296/216.07 |
| EP | 315516 | * | 5/1989 | ............ 296/216.07 |
| EP | 0 548 483 A2 | | 6/1993 | |
| EP | 1 101 688 A2 | | 5/2001 | |
| EP | 1 136 294 A2 | | 9/2001 | |
| JP | 357037014 | * | 3/1982 | ............ 296/216.07 |
| KR | 2002080970 | * | 10/2002 | |

* cited by examiner

Primary Examiner—Dennis H. Pedder
(74) Attorney, Agent, or Firm—Nixon Peabody LLP; David S. Safran

(57) ABSTRACT

A roof frame assembly of an openable motor vehicle roof for installation in the roof opening of a fixed motor vehicle roof is provided. The assembly includes a roof frame including at least one holding device for providing additional stabilization of the roof at least in the side area of a roof frame and at least one support tube attached to the frame via the holding device or devices. The at least one support tube is supported on one lengthwise member of the fixed motor vehicle roof to provide stability in the event of a side impact.

8 Claims, 4 Drawing Sheets

ROOF FRAME OF AN OPENABLE MOTOR VEHICLE ROOF

BACKGROUND OF THE INVENTION

1. Field of the Invention

The invention relates to the roof frame of an openable motor vehicle roof for installation in the roof opening of a fixed motor vehicle roof.

2. Description of Related Art

In openable motor vehicle roofs intended for later installation in a motor vehicle, when the size of the roof frame of the sunroof which is to be installed exceeds the distance between the transverse roof members, one transverse roof member must often be cut out, adversely affecting the stability of the motor vehicle roof, especially in a side impact or overturning of the motor vehicle.

SUMMARY OF THE INVENTION

Therefore, one object of the present invention is to provide an openable motor vehicle roof configured such that the stability of the motor vehicle roof is increased.

This object, and other objects, are achieved by providing a roof frame assembly of an openable motor vehicle roof for installation in the roof opening of a fixed motor vehicle roof, comprising a roof frame including at least one holding device positioned in a side area of the roof frame, and at least one support tube attachable to the roof frame via the at least one holding device. The at least one support tube is supportable on a side member of the fixed motor vehicle roof.

Essentially the present invention provides at least one holding device, in the side area of a roof frame, for attaching at least one support tube having a free end pointing at the side member of the fixed motor vehicle roof and terminating preferably a short distance in front of the side member. In this way, in the event of a side impact when the side member is deformed to the inside, the force is accommodated by the support tube and delivered to the roof frame of the openable motor vehicle roof. Since there is a support tube on the other side of the vehicle, likewise preferably a short distance from the side member, the force is routed through the support tubes and the roof frame as far as the opposing side member. The support tubes and the roof frame of the openable motor vehicle roof thus assume the stability function of the removed transverse roof member. Instead of ending a short distance in front of the side member, the support tubes in the limiting case can also adjoin the side members.

Advantageously, at least one holding device is located on a reinforcing sheet which is welded, for example, to the bottom of the roof frame in the area of one corner. This reinforcing sheet has several holding devices, preferably on one vertical ridge, which are spaced apart so that the support tube, depending on the roof structure, can be mounted at different points of the roof frame. Mounting takes place preferably in a detachable manner by means of a flange plate which is located on the support tube. The support tubes can be adapted in their length to the distance of the roof frame to the side member, so that an openable motor vehicle roof intended for later installation can be easily adapted to different vehicles.

DETAILED DESCRIPTION OF THE INVENTION

Figure 1:
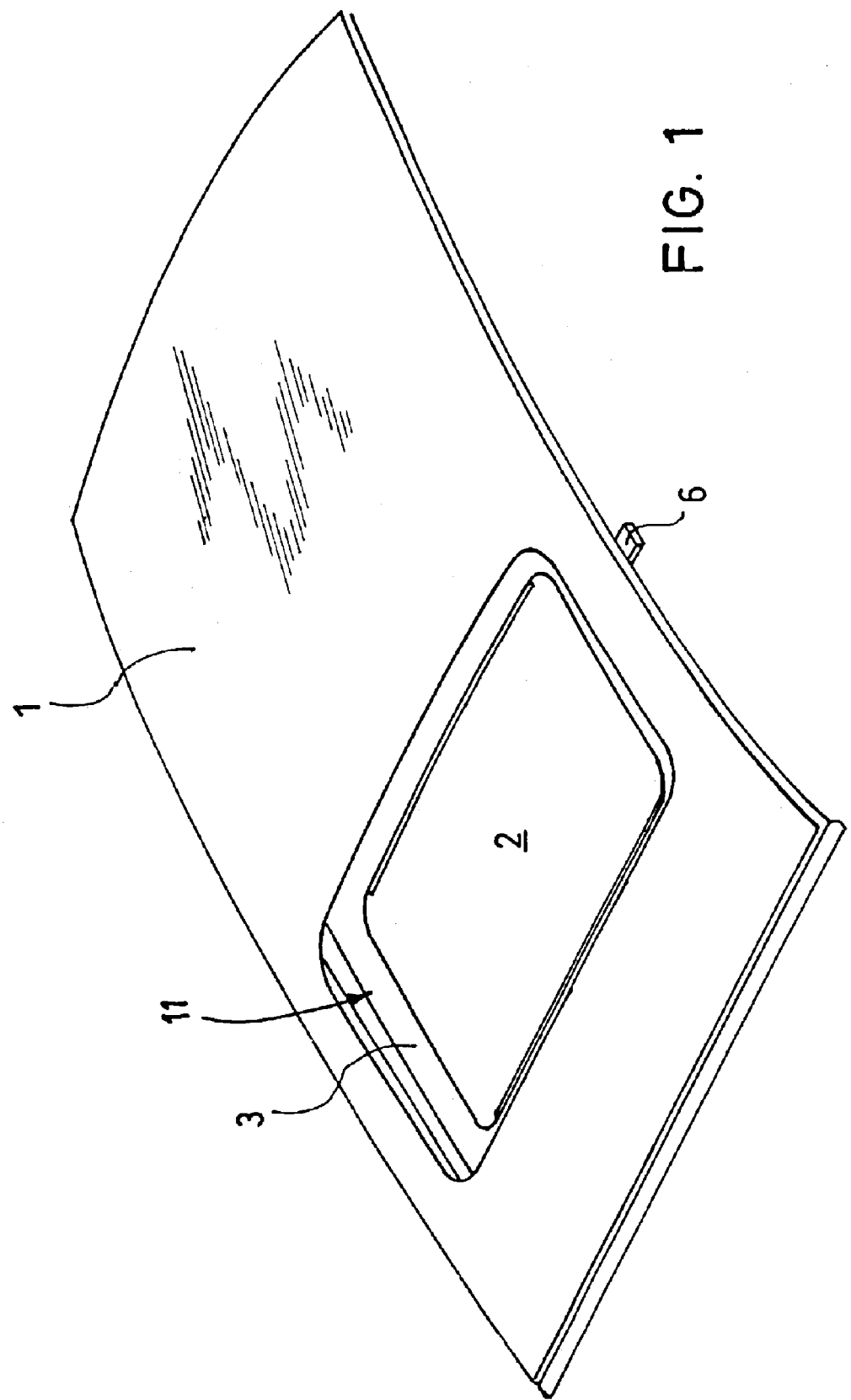
FIG. 1 shows a schematic perspective top view of a motor vehicle roof.

The fixed motor vehicle roof 1 has a roof opening 2 which is used for installation of an openable motor vehicle roof, of which in this application only the roof frame assembly 11 is shown. The other components of an openable motor vehicle roof such as the guide rail, actuating mechanism and cover are known to one skilled in the art, are not required to understand the present invention, and therefore have been omitted.

The roof opening 2 is recessed in the production of the roof sheet for serial installation of a motor vehicle roof. With an openable motor vehicle roof which has been installed later, the roof opening 2 is marked out by means of a template and cut out of the sheet metal of the fixed motor vehicle roof. When the size of the openable motor vehicle roof to be installed exceeds the distance of the transverse members in the roof area of the motor vehicle, a transverse member is also cut out accordingly.

The roof frame assembly 11 includes a roof frame 3 attached from the bottom around the edge of the roof opening 2 to the fixed motor vehicle roof 1. To increase the stability of the entire motor vehicle roof, a reinforcing sheet 4 is attached to the roof frame 3 and provided with several holding devices 5 which are spaced apart from one another and to which at least one support tube 6 at a time can be attached on either side of the roof frame 3.

Figure 2:
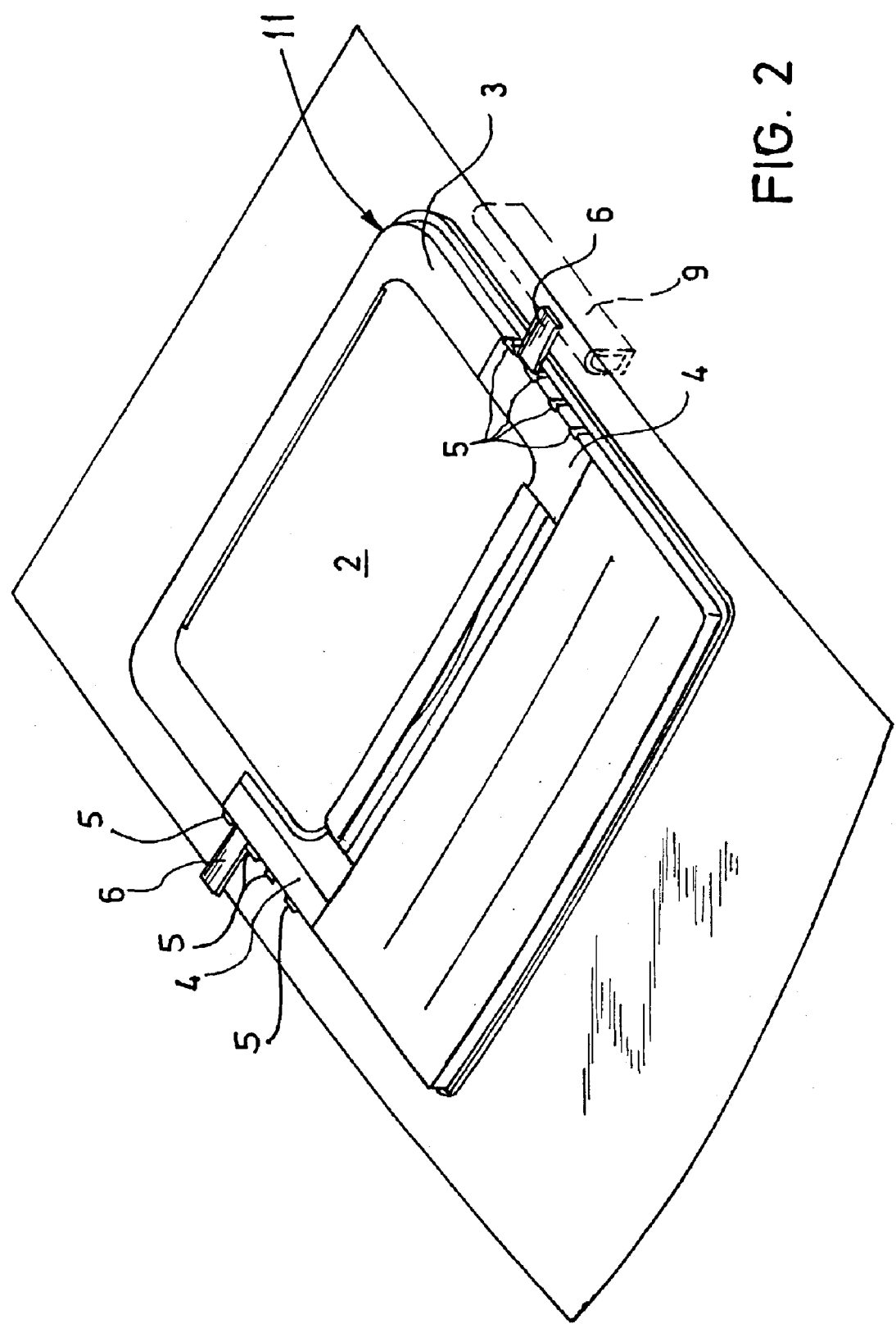
FIG. 2 shows a schematic perspective top view of the bottom of the motor vehicle roof of FIG. 1.
Figure 3:
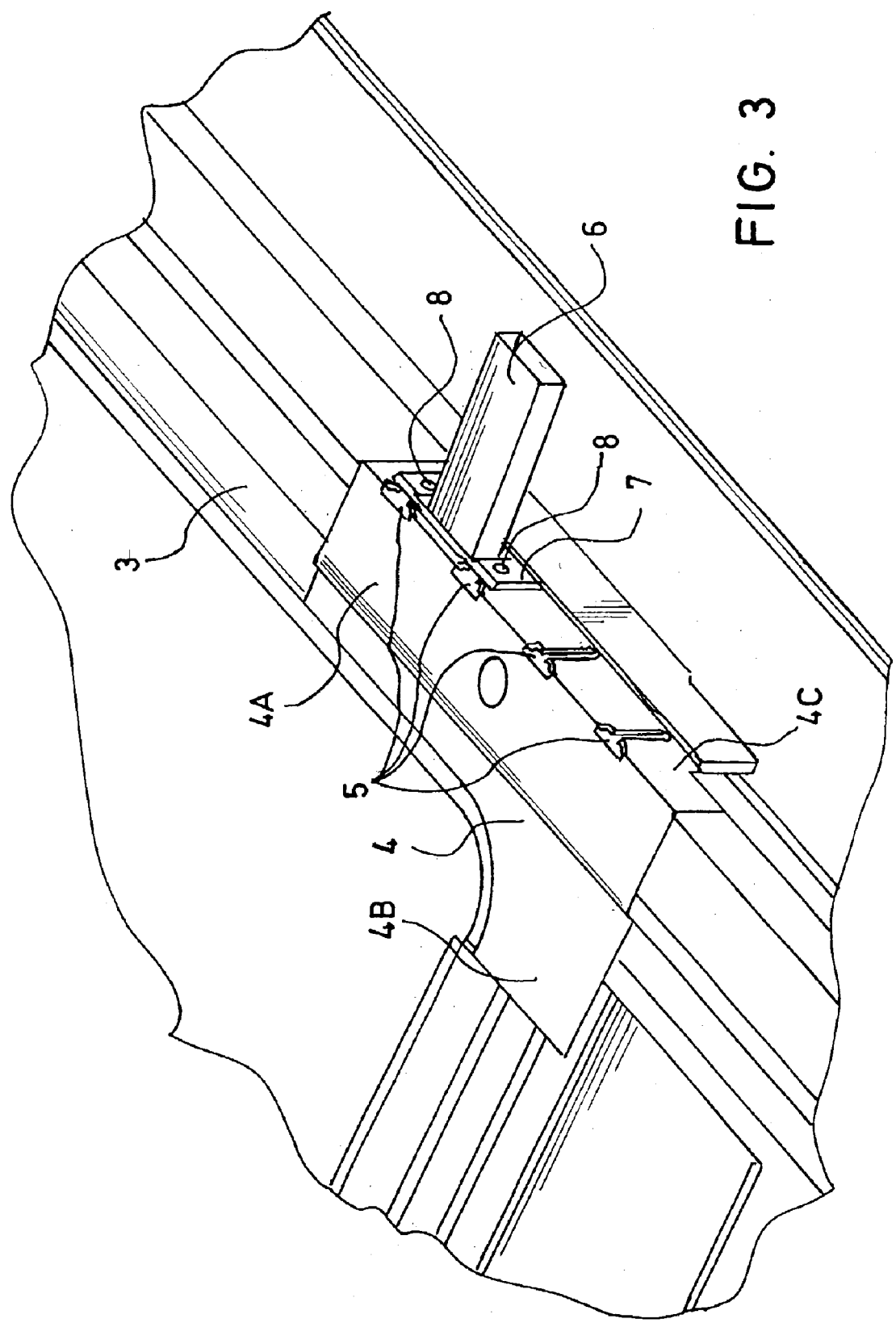
FIG. 3 shows an enlarged perspective of the rear frame corner of the roof frame as shown in FIG. 2.

The reinforcing sheet 4 is made in the form of an angled plate with a side leg 4A, a rear leg 4B and a vertical ridge 4C which is angled upward. The side leg 4A and the rear leg 4B are matched flat to the contour of the roof frame 3 and are attached to frame 3 by cementing or alternatively by welding. The holding devices 5 in the form of impressed projections pointing to the outside are molded onto the vertical ridge 4C. The projections have slots which are opened to the bottom (in FIGS. 2–4 opened to the top, since the roof frame is shown here in the reverse position).

Figure 4:
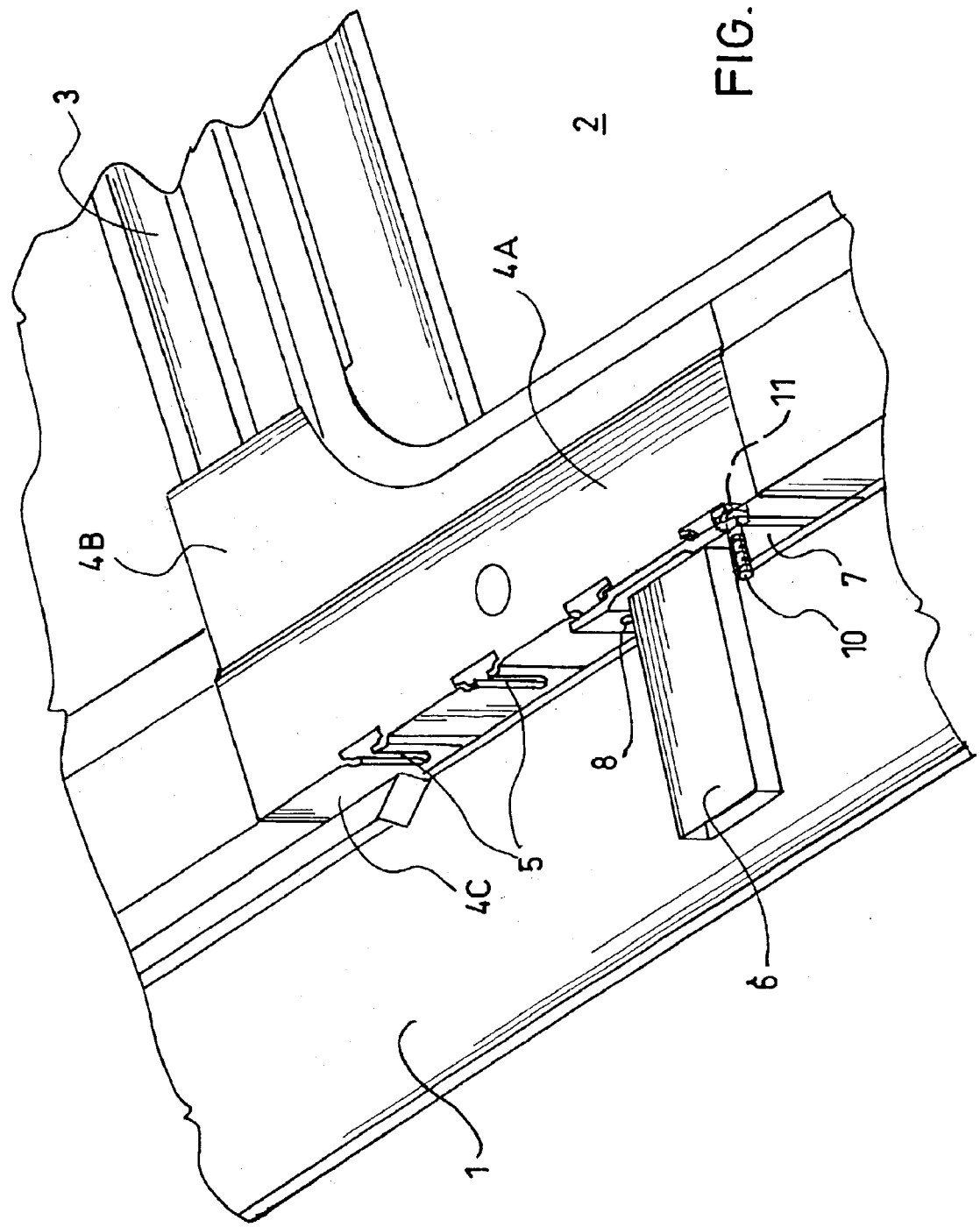
FIG. 4 shows the frame corner as shown in FIG. 3 from another perspective.

The support tubes 6, which extend horizontally to the outside, are formed as hollow box profiles with their inside surface facing the roof frame 3. The support tubes 6 are connected to a flange plate 7 which is located perpendicular thereto for example by welding. The flange plate 7 has two right-angle bends which are pointed to the outside, and shaped and extend a sufficient distance to match the projections of the holding devices 5. In the area of these right-angle bends, there is one hole 8 each which is aligned with the slot of the holding device 5, which slot lies behind. Bolts 10 (one of which is shown in FIG. 4) are inserted in the holes 8 such that their heads are facing the holding devices 5 while the bolt shaft is routed through the slots. The holding devices 5 are used to hold the bolt heads so the bolts cannot turn. After installation of the roof frame 3 in the fixed motor vehicle roof 1, the support tubes 6 are matched in their length to the distance to the adjacent side member 9 (shown schematically on one side in FIG. 2). The support tubes 6 are then inserted into the holding devices 5 with the bolts inserted into the holes 8 of the flange plate 7 or with their heads. Because there are several holding devices 5 spaced uniformly apart from one another, the application site of the support tubes 6 can be freely chosen according to the stability requirements of the respective roof structure. Even if in this embodiment the reinforcing sheets 4 are shown only in the area of the two rear corners of the roof opening 2, it is fundamentally possible to provide these reinforcing sheets with holding devices 5 also in the area of the front corners of the roof opening 2 so that if necessary there can be two support tubes 6 on each side of the roof frame 3.

Nuts 11 can be applied to the bolts 10 which will penetrate the holes 8 pointed to the outside after inserting the bolt heads into the holding devices 5. The flange plates 7 are fixed relative to the holding devices 5 by the nuts.

What is claimed is:

1. A roof assembly formed of an openable motor vehicle roof in a fixed vehicle roof having a lateral side member, comprising:
   an inner roof frame for the openable motor vehicle roof;
   at least one holding device positioned on an outer side of a side area of the roof frame;
   at least one support tube that is attachable at a first end to said roof frame via said at least one holding device, a second end of said at least one support tube being a free end that is positioned in proximity to an inner side of said side member of the fixed roof vehicle roof, without being connected thereto, for transferring side impact forces from the side member of the fixed roof to the roof frame of the openable motor vehicle roof.

2. The roof assembly of claim 1, wherein said roof frame includes a reinforcing sheet, said at least one holding device positioned on said reinforcing sheet.

3. The roof assembly of claim 2, wherein said at least one holding device includes several holding devices spaced apart from one another.

4. The roof assembly of claim 3, wherein the holding devices are located on a vertical ridge positioned on the reinforcing sheet.

5. The roof assembly of claim 1, wherein the support tube is located on a flange plate detachably mounted on said at least one holding device.

6. The roof assembly of claim 2, wherein the reinforcing sheet includes a side leg positioned in the side area of the roof frame and a rear leg which extends into one of a rear area and a front area of the roof frame.

7. The roof assembly of claim 1, wherein said at least one support tube includes two support tubes on each side of said roof frame.

8. The roof assembly of claim 1, wherein said at least one support tube is matched in length to a distance from the roof frame to the side member.

* * * * *